(12) United States Patent
Eckel et al.

(10) Patent No.: US 7,092,518 B2
(45) Date of Patent: Aug. 15, 2006

(54) CORDLESS TELEPHONE OUTLET DEVICE

(75) Inventors: David P. Eckel, Eaton's Neck, NY (US); Maxim Laurent, Brooklyn, NY (US); Parimal R. Patel, Holbrook, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/367,897

(22) Filed: Feb. 19, 2003

(65) Prior Publication Data

US 2004/0204017 A1   Oct. 14, 2004

Related U.S. Application Data

(60) Provisional application No. 60/360,840, filed on Mar. 1, 2002.

(51) Int. Cl.
*H04M 1/00* (2006.01)

(52) U.S. Cl. .................. 379/413.04; 439/535; 363/146

(58) Field of Classification Search ................ 363/146; 379/435, 437, 451, 454, 413.02–413.04; 439/535, 709, 536; 174/53; 220/3.94, 4.02
See application file for complete search history.

(56) References Cited

U.S. PATENT DOCUMENTS 4,647,725 A * 3/1987 Dellinger et al. ........ 379/26.01
5,900,584 A * 5/1999 Cady et al. .................... 174/66
6,362,987 B1 * 3/2002 Yurek et al. ................ 363/146

* cited by examiner

*Primary Examiner*—Sinh Tran
*Assistant Examiner*—Walter F Briney, III
(74) *Attorney, Agent, or Firm*—Paul J. Sutton

(57) ABSTRACT

A cordless telephone outlet device that not only provides the cordless telephone access to a telephone network, but also provides the cordless telephone the proper DC electrical energy for proper operation eliminating the need for an unsightly external DC power supply typically connected to an AC outlet. Further, the device significantly reduces exposure of the telephone line connection between the cordless telephone and the telephone network. The outlet device comprises a body having a communications connector mounted thereon and a base attached to the body. The base contains DC power supply circuitry that is connected to a source of AC electrical energy. The output of the power supply circuit is connected to a DC line terminated with a DC male plug. The cordless telephone can be directly mounted onto the device allowing the communications connector of the cordless telephone to engage directly with a corresponding communications connector mounted onto the device of the present invention while the device also provides DC power to the cordless telephone via the DC male plug. Alternatively, a relatively short telephone line cable can be used to electrically connect the respective communications connectors with the cordless phone mounted onto the outlet device of the present invention.

10 Claims, 4 Drawing Sheets

CORDLESS TELEPHONE OUTLET DEVICE

This non-provisional application claims the benefit of the filing date of a provisional application having application Ser. No. 60/360,840 which was filed on Mar. 1, 2002.

BACKGROUND OF THE INVENTION

1. Field of the Invention

The present invention generally relates to outlets used for telephones and particularly to outlets used for cordless phones.

2. Description of the Related Art

Cordless telephones have become enormously popular and are being installed in new and existing housing at increasing rates. Cordless phones comprise a base unit and a headset whereby the base unit communicates with the headset by the use of radio signals. Also, cordless telephones typically have other features such as automatic answering circuitry that respond to an incoming call. Therefore, cordless phones usually have additional circuitry that are used to provide the aforementioned features and also allow the base to communicate with the headset when the phone is being used by a user. Cordless phones require a source of power to operate the needed circuitry. As with most electronic/electrical devices, the circuitry uses DC (direct current) power. Accordingly, cordless telephones usually have their own power source that is typically implemented with a DC power supply that is plugged into a standard AC (alternating current) outlet. The DC power supply converts the 120 volt AC power signal into a DC signal that powers the electronic circuitry of the cordless phone. For example, many cordless phone manufacturers have chosen to provide a two inch cube power supply, typically a step down transformer, that plugs into a standard 120 VAC wall outlet. The power supply converts the 120 VAC signal into a DC signal (e.g., 12 VDC) which is then fed to the base of the cordless phone via one or more non-standard low voltage connectors.

In addition to the power cord, cordless phones have a standard telephone cable (comprising at least two separate wires) that is used to connect the phone to a telephone network such as the Public Switched Telephone Network (PSTN). For cordless phones, the connection to the PSTN has essentially become standardized. Typically, there is an RJ11 style connector mounted on a wall and an RJ11 style connector mounted somewhere on the base unit of the cordless phone. The user simply connects one end of a mating cable (or telephone line) to the RJ11 connector mounted on the wall and the other end of the mating cable (or telephone line) to the RJ11 connector mounted on the base of the cordless phone; it is in this manner that the cordless phone is connected to the PSTN.

As a result, a typical cordless phone has an arrangement in which two cords (one of which is connected to an AC outlet) emanate from the base unit of the cordless phone and connect to outlets or connectors mounted on a wall. In addition to the existence of two cords and an unsightly and bulky power supply, the arrangement allows the cords to be exposed and thus be vulnerable to possible accidental damage. Accidental damage to the cords, in particular, to the power cord may lead to physical harm to a user of the cordless phone. Also, the cordless phone uses up an AC outlet that could have been used for another electrical/electronic appliance.

What is therefore needed is a cordless phone in which the exposure of the power cord and the telephone line is significantly reduced and a device that eliminates the need to have a wall mounted DC power supply for the cordless telephone.

SUMMARY OF THE INVENTION

The present invention provides an integrated power supply and telephone outlet device for a cordless telephone whereby the device eliminates the need for a DC power supply connected to an AC outlet and significantly reduces the exposure of the power cord and the telephone line of the cordless telephone. The device comprises a face plate attached to a body to which a base is attached. A communications connector is mounted onto the body and communications connector terminals electrically connected to the communications connector are also attached to the body. The communications connector terminals are electrically connected to wires of a telephone line or cable from a telephone network. The base is configured as a housing which contains conversion circuitry, i.e., circuitry that converts AC electrical energy to DC electrical energy. The base has attached thereto DC terminals to which a DC line is connected for connection to a cordless phone via a DC connector. The conversion circuitry in the base is electrically connected to a source of AC electrical energy via electrical terminals mounted onto the base. The DC line is one or more electrical wires connected to DC terminals mounted on the body which terminals are coupled to the conversion circuitry in the base and thus provide DC electrical energy originating from the conversion circuitry. The DC connector terminates the DC line, which DC connector is used to electrically connect the cordless phone to the outlet device of the present invention. The cordless phone may have a mating communications connector which directly engages the communications connector mounted onto the body or a cable may be used to connect the communications connector of the outlet device of the present invention to the cordless telephone.

DETAILED DESCRIPTION

The present invention provides an integrated power supply and telephone outlet device for a cordless telephone whereby the device eliminates the need for a DC power supply connected to an AC outlet and significantly reduces the exposure of the power cord and the telephone line of the cordless telephone. The device comprises a face plate attached to a body to which a base is attached. A communications connector is mounted onto the body and communications connector terminals electrically connected to the communications connector are also attached to the body. The communications connector terminals are electrically connected to wires of a telephone line or cable from a telephone network. The base is configured as a housing which contains conversion circuitry, i.e., circuitry that converts AC electrical energy to DC electrical energy. The base has attached thereto DC line terminals to which a DC line is connected for connection to a cordless phone via a DC connector. The conversion circuitry in the base is electrically connected to a source of AC electrical energy via electrical terminals mounted onto the base. The DC line is one or more electrical wires connected to DC terminals mounted on the body which terminals are coupled to the conversion circuitry in the base and thus provide DC electrical energy originating from the conversion circuitry. The DC connector terminates the DC line, which DC connector is used to electrically connect the cordless phone to the outlet device of the present invention. The cordless phone may have a mating communications connector which directly engages the communications connector mounted onto the body or a cable may be used to connect the communications connector of the device of the present invention to the cordless telephone. The device of the present invention thus provides DC power and connection to a telephone network to a cordless phone eliminating the need for a bulky power supply connected to an AC outlet. Further, the device of the present invention significantly reduces exposure of the DC power line providing power to the cordless telephone and the communication cable providing the cordless phone access to a telephone network.

Figure 1:
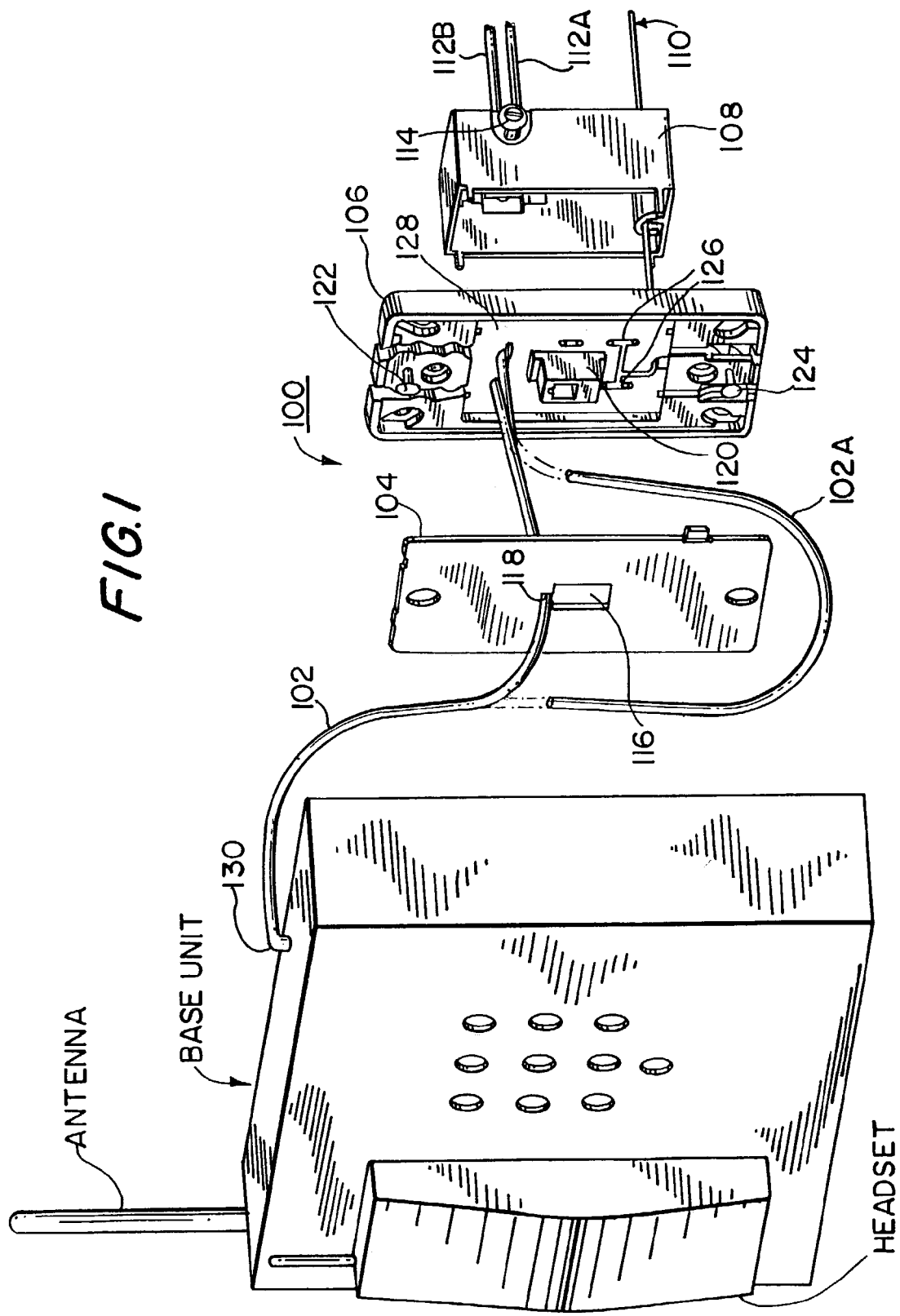
FIG. 1 shows an exploded perspective view of the device of the present invention with a DC line connecting the device to a cordless telephone.

Referring now to FIG. 1, there is shown the cordless telephone outlet device of the present invention connected via a DC power line 102 to a cordless telephone. For the sake of clarity, the connection between the communications connector 120 of the device and the communication connector (not shown) of the cordless telephone is not shown. The device of the present invention comprises face plate 104 that is affixed to body 106 in a snap arrangement. The device of the present further comprises base 108 that also snaps onto body 106. Base 108 contains some circuitry (not shown) which converts AC electrical energy received via power lines 112A and 112B that terminate at terminals 114 (only one of which is shown). Some of the circuitry in base 108 converts the AC electrical energy in a well known manner to DC electrical energy. For example the circuitry that converts AC to DC can be a power supply such as a switching power supply which is a well known circuit that uses oscillating signals to produce a DC voltage and/or current. The power supply can also be implemented using a full wave bridge rectifier connected to a Darlington amplifier (using two transistors) such as the circuit disclosed in U.S. Pat. No. 6,031,750 which is incorporated herein by reference. In sum, any well known DC power supply circuit that converts AC electrical energy to DC electrical energy can be used within base 108 to provide DC electrical energy to the cordless phone shown in FIG. 1. The DC electrical energy is transferred onto body 106 through well known means, one of which is discussed below. The DC electrical energy is connected to DC line 102 which is terminated by a DC connector 130 (e.g., DC male plug) that is used to provide DC electrical energy to the cordless phone. The DC connector can be configured as any of the well known female or male connectors used for portable electronic devices. As shown in FIG. 1, DC line 102 can take alternate paths from body 106 to the cordless phone. In particular, DC line 102 can be routed through a notch 118 in opening 116 of face plate 104 or DC line 102A can be routed underneath face plate 104. DC line 102 is attached to DC terminals on island 128 of body 106 through well known means. The output of the conversion circuitry in base 108 is electrically connected to the DC terminals on island 128. When the device of the present invention is assembled, connector 120 extends through opening 116 of face plate 104.

Continuing with FIG. 1, telephone line 110 (comprising at least two wires) from a telephone network such as the PSTN is routed through base 108 and terminates at various terminals 126 which are electrically connected to communications connector 120. Communications connector 120 is mounted onto island 128 which is designed to accommodate various types of communications connectors such as RJ11 connectors, RJ45 connectors and other types of connectors known as Category 3 and Category 5 connectors. The different types of connectors relate to the bandwidth and speed of the signals (data and/or voice) that they carry. The cordless phone has a corresponding communication connector (not shown, typically located at the bottom of the base unit of the cordless telephone) which can directly engage connector 120 or can be electrically connected to connector 120 with a relatively short cable (not shown). Body 106 further has attached thereto mounting screws 122 and 124 with which the cordless telephone can be mounted. It should be noted that cordless phones are often mounted on a wall. The body and face plate of the present invention can be mounted on the wall with the base positioned inside or behind the wall. The base unit of a cordless telephone can then be attached to the outlet device via mounting screws 122 and 124.

Figure 2:
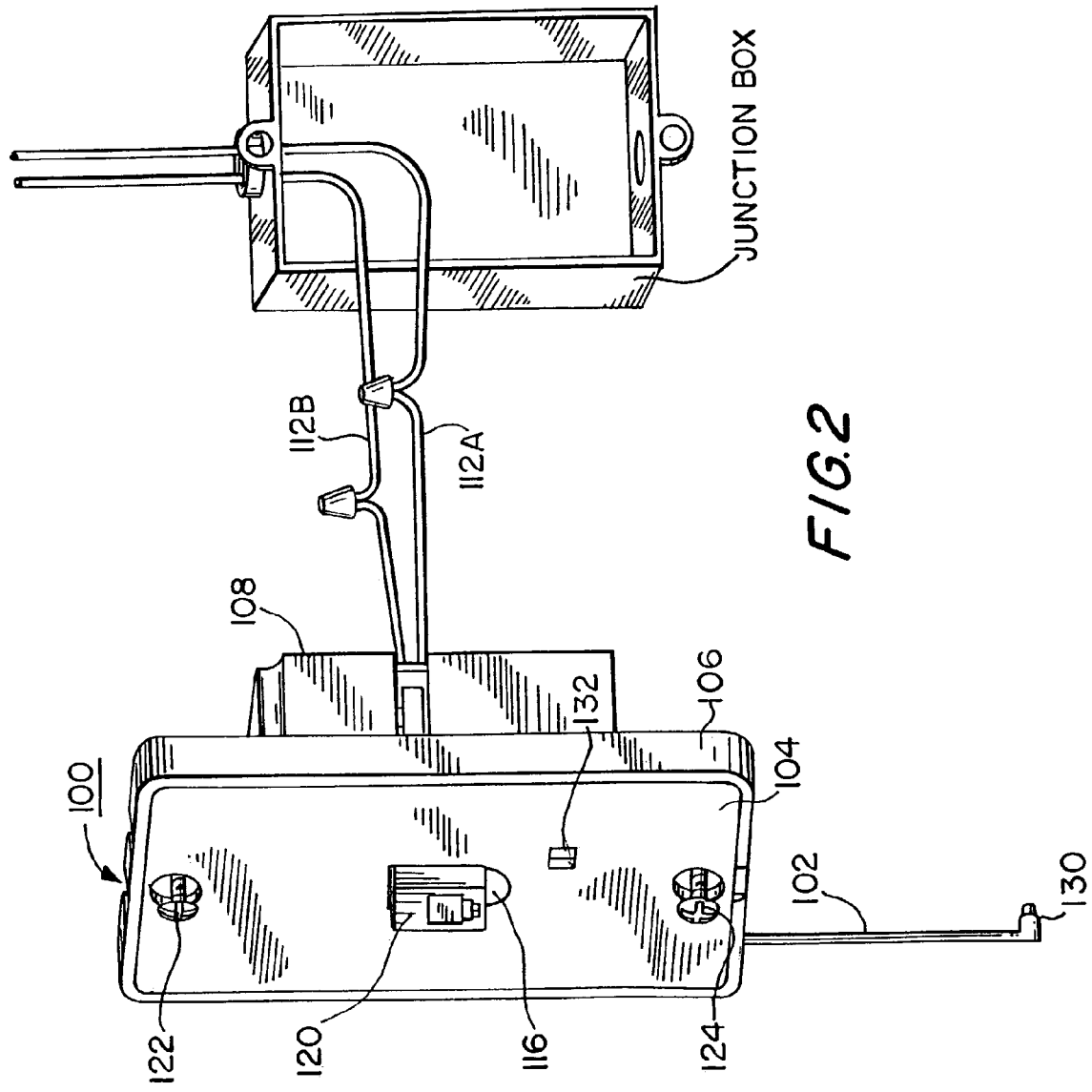
FIG. 2 shows a perspective view of an assembled device of the present invention connected to a source of AC electrical energy.

Referring now to FIG. 2, there is shown the device of the present invention completely assembled and connected to a source of AC electrical energy via a junction box. The junction box is typically located inside a wall and is usually mounted to a beam structure of the wall. Note, that the device of the present invention has a DC power select switch 132 which can be used to set the power supply circuit in base 108 to the proper DC voltage for proper operation of a cordless telephone attached to the outlet device of the present invention. The select switch is part of the DC power supply circuit located in base 108. The power supply can be designed to provide different DC voltage values where such values can be selected using select switch 132. Select switch 132 can be configured as a slide switch or any other well known switch configuration. In a preferred embodiment, the circuitry located in base 108 provides DC voltages of 9 volts and 12 volts. However, it should be noted that the device of the present invention is certainly not limited to these voltages. It will be readily understood by one skilled in the art to which this invention belongs that the circuitry located within base 108 can provide other DC voltage values.

Figure 3:
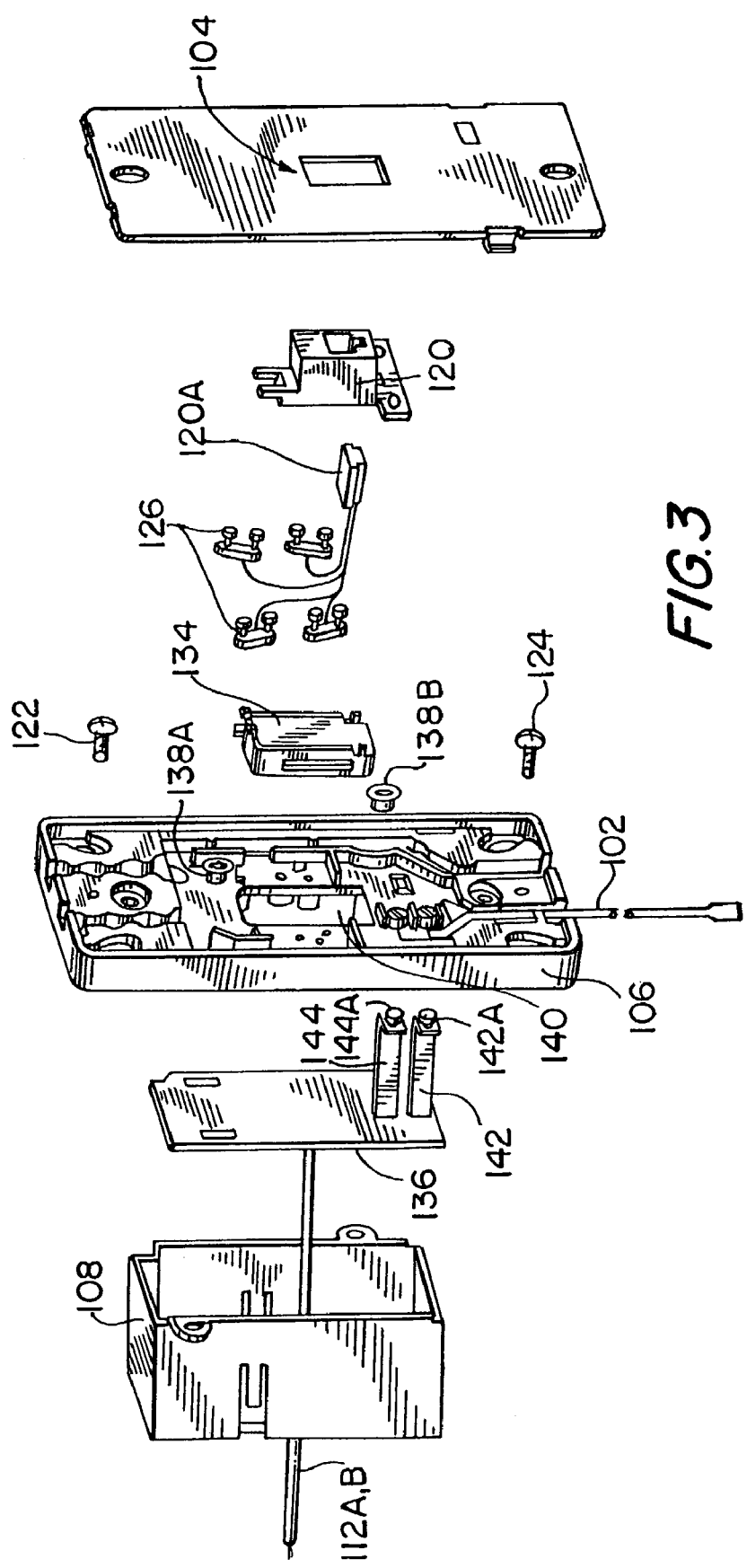
FIG. 3 shows an exploded perspective view of another embodiment of the device of the present invention.

Referring now to FIG. 3, there is shown a perspective view of another embodiment of the device of the present invention. Base 108 contains printed circuit board 136 on which various circuitry (not shown) that convert AC electrical energy to DC electrical energy are mounted. Printed circuit board 136 has two DC terminals 142, 144 terminated by screws 142A and 144A. Screws 142A and 144A extend through an opening of body 106 as shown. DC power line 102 originates from screws 142A and 144A. Eyelet fasteners 138A and 138B are used to attach body 106 to base 108. Body 106 has body slot 140 through which connector barrier 134 extends and snaps onto body 106. Connector assembly 120A engages connector 120 through a rear opening in connector 120 (not shown) to electrically connect the various terminals 126 to distinct pins (not shown) of connector 120. The connector assembly 120A with terminals 126 engaged with connector 120 are coupled to connector barrier 134 via a snap engagement. A more detailed depiction of the connector 120, connector assembly 120A and terminals 126 and connector barrier 134 is shown in FIG. 4.

Figure 4:
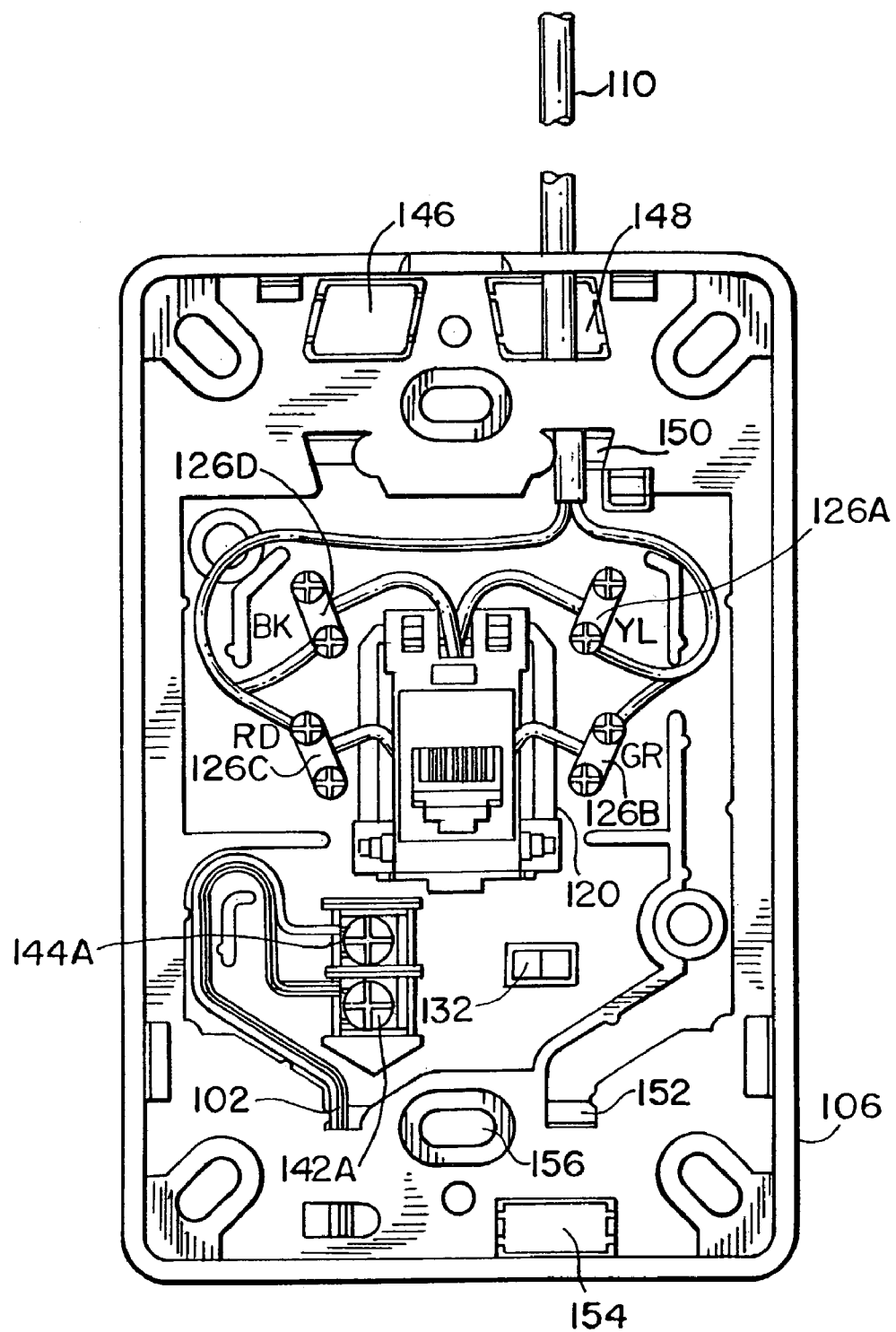
FIG. 4 shows a front view of the body portion of the embodiment shown in FIG. 3.

Referring now to FIG. 4, there is shown a front view of body 106 with the connector 120 mounted thereto. Telephone line 110 from a telephone network such as the PSTN is shown as comprising four wires (black, yellow, red, and green wires). The wires of telephone line 110 are selectively connected to the various terminals of connector assembly 120A. In particular, the black wire is connected to terminal 126D, the red wire is connected to terminal 126C, the yellow wire is connected to terminal 126A and the green wire is connected to terminal 126B. Telephone line 110 is shown as having been received through openings 148 and 150 of body 106. It will be readily obvious that telephone line 110 can be routed through any of the openings (e.g., 146, 152, 154, 156) of body 106. DC power select switch 132 can be mounted on printed circuit board 136 (see FIG. 3), or mounted within body 106.

Therefore, the device of the present invention provides access to a telephone network while at the same time provides DC power to a cordless telephone eliminating the need for a bulky and unsightly DC power supply for connection to an AC outlet. The DC power supply circuit is completely separated (i.e., electrically separated and mechanically separated) from the telephone line or communications circuit or connector. There is no direct connection of any type between the telephone line and the AC power line or between the DC power line and the telephone line. Further, the circuitry contained in base 108 provides surge protection for the telephone line and the power line so that if there is an electrical power surge (due to, for example, lighting, voltage spikes, current spikes) on either the AC power line or the telephone line, the device of the present invention and the cordless telephone connected to the device of the present invention will be adequately protected.

We claim:

1. An outlet device comprising:
   a base containing conversion circuitry for converting AC electrical energy to DC electrical energy, the base having a first set of terminals capable of being connected to power lines carrying AC electrical energy and a second set of terminals extending from the base and providing the DC electrical energy; and
   a body attached to the base, the body having an opening through which the second set of terminals of the base extends allowing a DC line routed through the body to be electrically connected to the second set of terminals, the body further having at least one communications connector mounted thereon, the communications connector being electrically connected to one or more communication terminals within the body which terminals are electrically connected to one or more communication lines routed through the body and the base.

2. The outlet device of claim 1 further comprising a face plate affixed to the body in a snap arrangement.

3. The outlet device of claim 2 where the face plate has an opening through a portion of which the communications connector extends and through another portion of which a DC line is routed.

4. The outlet device of claim 1 where the conversion circuitry is a switching power supply.

5. The outlet device of claim 1 where the conversion circuitry is a full wave bridge rectifier connected to a Darlington pair amplifier.

6. The outlet device of claim 3 where one end of the DC line terminates at the second set of terminals and the other end of the DC line is terminated with a DC male plug connector.

7. The outlet device of claim 1 where the communications connector is an RJ 11 or an RJ45 connector.

8. The outlet device of claim 1 where the conversion circuitry is a DC power supply that has a select switch used to select different DC voltages to be provided by the power supply.

9. The outlet device of claim 1 where the communications connector is electrically connected to a connector assembly having terminals which are connected to a communications network.

10. The outlet device of claim 1 where the body has mounted screws on which a cordless phone can be mounted.

* * * * *